United States Patent [19]

Guarino et al.

[11] 4,071,425

[45] Jan. 31, 1978

[54] RADIATION CURABLE COATING

[75] Inventors: John P. Guarino, Trenton; William H. McCarty, White House Station, both of N.J.

[73] Assignee: Mobil Oil Corporation, New York, N.Y.

[21] Appl. No.: 753,755

[22] Filed: Dec. 23, 1976

Related U.S. Application Data

[63] Continuation-in-part of Ser. No. 471,375, May 20, 1974, abandoned.

[51] Int. Cl.$^2$ .......................... C08F 2/46; C08F 4/00
[52] U.S. Cl. .......................... 204/159.24; 204/159.16; 204/159.18
[58] Field of Search ................ 96/115 P; 204/159.14, 204/159.16, 159.18, 159.23, 159.24

[56] References Cited

U.S. PATENT DOCUMENTS

| | | | |
|---|---|---|---|
| 3,661,576 | 5/1972 | Crary | 96/115 P |
| 3,676,398 | 7/1972 | D'Alelio | 204/159.14 |
| 3,714,006 | 1/1973 | Anderson | 204/159.14 |
| 3,719,728 | 3/1973 | Mirnada | 204/159.14 |
| 3,759,807 | 9/1973 | Osborn et al. | 96/115 P |
| 3,776,729 | 12/1973 | Levy | 96/115 P |
| 3,787,212 | 1/1974 | Hunsch et al. | 96/115 R |
| 3,804,735 | 4/1974 | Redlove et al. | 96/115 P |
| 3,878,075 | 7/1974 | McGinniss | 96/115 P |

*Primary Examiner*—Jack P. Brammer
*Attorney, Agent, or Firm*—Charles A. Huggett; Hastings S. Trigg

[57] ABSTRACT

A radiation curable coating composition for various substrates contains an adduct of acrylic acid and an epoxy resin (which may be modified with an anhydride, such as maleic anhydride), and a reactive acrylate monomer vehicle. The coating composition can be pigmented and can also contain additives commonly used in coatings, such as wetting agents and flow control agents. The coating composition does not require the usual hydrocarbon vehicles that give rise to air pollution problems. Surface gloss of a UV cured film obtained from a pigmented coating composition can be increased by using a photosensitizer combination of 2-chlorothioxanthone and a phenylketone, such as benzophenone. Adhesion of a cured coating is improved by replacing the tertiary amine co-sensitizer, at least in part, with dimethylaminoethyl acrylate.

6 Claims, No Drawings

RADIATION CURABLE COATING

CROSS-REFERENCE TO RELATED APPLICATIONS

This application is a continuation-in-part of copending application Ser. No. 471,375, filed May 20, 1974, now abandoned.

BACKGROUND OF THE INVENTION

1. Field of the Invention

This invention is directed to epoxy acrylate ester coatings for substrates, that are curable with radiation.

2. Description of the Prior Art

British Pat. No. 1,241,851 describes a process for coating an article that comprises applying a film of an ethylenically unsaturated ester having hydroxyl groups and exposing it to ionizing radiation. No liquid vehicle is used.

The coating composition of this invention comprises a similar resin in a vehicle that is a reactive monomer. This vehicle, when the coating composition is exposed to radiation and set, reacts with the resin and becomes an integral part of the resultant coating.

SUMMARY OF THE INVENTION

This invention provides a coating composition that comprises an adduct of acrylic acid and an epoxy resin, or an anhydride modified adduct, and a reactive acrylate monomer. a photosensitizer and a tertiary amine co-sensitizer are used in the case of ultraviolet (UV) light cured coatings.

It also provides a UV curable pigmented coating composition that contains a photosensitizer combination of 2-chlorothioxanthone and a phenyl ketone.

It further provides a UV curable coating composition that affords improved film adhesion, in which at least part of the tertiary amine co-sensitizer is replaced with dimethylaminoethyl acrylate.

It still further provides substrates coated with the aforedefined coating compositions.

DESCRIPTION OF SPECIFIC EMBODIMENTS

Prior practice has been to coat substrates, such as metals useful for container manufacture, with a variety of coating compositions comprising heat curable resinous components and non-reactive, volatile organic solvents that are removed from the coating during the curing process. Recent restrictions on allowable atmospheric pollutants, the shortage of organic solvents, and the shortage of fuels useful for firing curing ovens has created a need for coating compositions which can be cured with lower energy requirements and which eliminate the need for non-reactive organic solvents.

The coating compositions of this invention comprise an adduct, a reactive monomer vehicle, and optionally a photosensitizer. The adduct is an adduct of acrylic acid and an epoxy resin or such adduct further modified by reaction with an anhydride.

The epoxy resin can be any polyglycidyl ether of polyhydric organic compounds, especially polyhydric phenols. Particularly preferred are the glycidyl ethers of bisphenols, a class of compounds which are constituted by a pair of phenolic groups interlinked through an intervening aliphatic bridge. While any of the bisphenols may be used, the compound 2,2-bis (p-hydroxyphenyl) propane, commonly known as bisphenol A, is more widely available in commerce and is preferred. While polyglycidyl ethers can be used, diglycidyl ethers are preferred.

Depending upon whether the epoxy resin is substantially monomeric or polymerized to some degree, the preferred epoxy resins will have an epoxy equivalent weight of between about 170 and about 2,000 and an epoxy value between about 0.60 and about 0.05. The preferred epoxy resins, i.e., those made from bisphenol A, will have two epoxy groups per molecule. Accordingly, the stoichiometric amount of acrylic acid to form a diacrylate adduct would be two moles of acid for each two epoxy groups. In practice, however, it is preferred to use slightly less acid than the amount necessary to cover both epoxy groups to be certain that there is no free acrylic acid remaining in the reaction product. Free acid would contribute to excessive volatility of deposited films, while minor amounts of free epoxy are not objectionable. Therefor, the amount of acrylic acid reacted can be between about 1.85 moles to 2.0 moles of acid per two epoxy groups. The esterification reaction between the acylic acid and epoxy resin is carried out on an esterification temperature, e.g. between about 90° and about 110° C. Esterification is continued until an acid number of 5-15 is obtained. This reaction ordinarily takes place in 8-15 hours.

In another embodiment of this invention, the epoxy diacrylate is further reacted with an anhydride. Maleic anhydride is preferred but other anhydrides are contemplated for this purpose, such as citraconic anhydride, succinic anhydride, ethylsuccinic anhydride, amylenesuccinic anhydride, itaconic anhydride, glutaric anhydride, $\Delta$ 4-tetrahydrophthalic anhydride, phthalic anhydride, hemimellitic anhydride, trimellitic anhydride, and pyromellitic anhydride. The amount of anhydride used will be between about 0.1 and about 1.0 mole anhydride per mole diacrylate resin. This reaction is generally carried out at temperatures between about 80° and about 90° C. The reaction is considered complete when the alcoholic KOH and aqueous KOH acid numbers agree, i.e., about 10-40. This evidences a complete absence of anhydride functionality.

The esterification reaction and the further reaction with anhydride can occur without the aid of a catalyst. However, catalysts are preferred such as tertiary amines; quaternary ammonium hydroxides, such as benzyltrimethylammonium hydroxide; N,N-dimethylaniline; N,N-benzylmethylamine; triethylamine; and KOH. It is also advantageous to use small amounts of hydroquinone as a polymerization inhibitor.

The epoxy diacrylate or the anhydride modified epoxy diacrylate, prepared as aforedescribed, is then dissolved in a reactive monomer vehicle to prepare the coating composition. The reactive monomer vehicle contemplated herein is a monofunctional ester of acrylic acid having from 4 to about 20 carbon atoms. The acrylate ester can be an alkyl or hydroxyalkyl acrylate, such as methyl acrylate, ethylacrylate, hydroxyethyl acrylate, propyl acrylate, isopropyl acrylate, hydroxypropyl acrylate, butyl acrylate, isobutyl acrylate, amyl acrylate, hexyl acrylate, octyl acrylate, 2-ethylhexyl acrylate, decyl acrylate, dodecyl acrylate, tetradecyl acrylate, and hexadecyl acrylate. Also contemplated are the acrylic esters of the well known class of ether alcohols having the formula: $ROCH_2CH_2OH$, wherein R is $C_1-C_6$ alkyl or phenyl, i.e. the Cellosolves. Examples of such esters are methoxyethyl acrylate (Methylcellosolve acrylate), ethoxyethyl acrylate (Cellosolve acrylate), butoxyethyl acrylate (Butylcellosolve acrylate), isobutoxyethyl acrylate (Isobutylcellosolve acrylate), hexoxyethyl acrylate (Hexylcellosolve acrylate), and phenoxyethyl acrylate (Phenylcellosolve acrylate). The contemplated reactive monomer vehicle can be designated by the formula: $CH_2=CH_2COOR'$, wherein $R'$ is hydrogen, $C_1-C_{15}$ alkyl, or $-C_2H_4OR''$, wherein $R''$ is $C_1-C_6$ alkyl or phenyl. The reactive monomer vehicle can contain a minor amount (up to about 20 weight percent) of a polyfunctional acrylate, e.g., neopentyl glycol diacrylate, but it is predominantly monofunctional.

The coating composition is cured by exposure to radiation. When the radiation used is electron beam radiation a photosensitizer is not needed, but when ultraviolet light is used, a photosensitizer is needed. Suitable sensitizers include acetophenone, benzophenone, xanthone, benoin isobutyl ether, and 2-chlorothioxanthone. 2-Chlorothioxanthone is preferred, particularly when the formulation is pigmented. A tertiary amine co-sensitizer may also be used in the UV curable coating formulation and serves to speed up the cure rate. In order to realize this function, it is necessary to have free amine present. Accordingly, the amine concentration range is from about 1.25 to about 3 times the amount required to neutralize free acidity. The amount required for neutralization can be readily calculated from the determined acid number of the resin. The tertiary amines are normally liquid trialkylamines, trialkanolamines, or tertiary mixed alkylalkanolamines. Non-limiting examples of such amines are triethylamine, triisopropylamine, tributylamine, trihexylamine, tri-2-ethyl-hexylamine, tridodecylamine, methyldiethanolamine, dimethylethanolamine, 2-hydroxyethyl-diisopropylamine, and triethanolamine.

The coating compositions described so far produce clear coatings and are useful as such.

Although a pigment is not necessary, it is preferred to incorporate a pigment into the coating composition of this invention. The amount of pigment used to achieve the purpose of using it, i.e., opacity and hiding power, is well known to those skilled in the coatings art. In general, the amount of pigment used can be between about 25 weight percent and about 60 weight percent, by weight of the entire coating composition. Ordinarily between about 30 weight percent and about 50 weight percent is sufficient. The preferred pigment is titanium dioxide for white base coats, but any well known filler pigment can be used, such as zinc oxide, bentonite, silica, ochers, and chrome yellows or greens.

Depending upon whether the coating composition is pigmented or not, the broad and preferred ranges of concentration of the components are as set forth in the following Table I.

about 1-20 mg/sq. in. After application, the coating is set by exposure to radiation for between about 0.01 second and about 30 seconds. In some cases, the coating will be set by short exposure to radiation, e.g. less than one second, which is sufficient to set the film so that it will accept inks and/or a wet-ink varnish. Following the printing or varnishing operation, these coats may be further set by baking at about 250° to 450° F. for between about 3 seconds and about 5 minutes.

Suitable sources of radiation are ultraviolet light or electron beam radiation. Preferably, an ultraviolet light of a wave length below 4000 Angstrom Units is used. The electron beam radiation is obtained from high energy electrons produced by high voltage electron accelerators. These are well known and include the Vande-Graaff accelerator, resonant transformers, transformer rectifiers, microwave waveguide linear accelerator, and synchrotrons.

The following examples demonstrate the preparation of adducts and coatings containing them, in accordance with this invention.

EXAMPLE 1

Using a vessel equipped with an agitator, a reflux condenser, an inert gas inlet and a charging port, there was charged 660 grams Epon 828. Epon 828 is a diglycidyl ether of bisphenol A having an epoxy equivalent weight of about 185-192 and an epoxide value of 0.050-0.54. Through the gas inlet was introduced a nitrogen flow which was maintained throughout the resin preparation cycle. While under agitation, 238 grams glacial acrylic acid was added and stirred until epoxy resin dissolved. Upon dissolution of the acrylic acid, 1.3 grams triethyl amine and 0.1 gram hydroquinone were added. Under continued agitation, heat was raised to 205-212° F. and held at this temperature until an acid number of 5-10 was obtained (approximately 10 hours). Temperature was reduced to 150-160° F. and 600 grams hydroxypropyl acrylate was added and the mixture was stirred until uniform. The final product was a clear solution of prepolymer in monomer at a 60/40 weight ratio.

EXAMPLE 2

Using a vessel equipped as in the previous example, there were charged 7200 g. Epon 828, 2590 g. glacial acrylic acid, 15 g. triethyl amine and 1.2 g hydroquinone. Agitation was started along with nitrogen flow and the mixture was heated to 100° C. Temperature was maintained at 95°-100° C. until an acid number of 5-10 was obtained; at this point, was added 432 g. maleic anhydride and the temperature was held at 90° C. until the acid number, as determined by alcoholic KOH and Table I

| Component | Broad, Wt. % | | Preferred, Wt. % | |
| --- | --- | --- | --- | --- |
| | Pigmented | Not Pigmented | Pigmented | Not Pigmented |
| Adduct Resin | 10-30 | 10-75 | 15-30 | 10-50 |
| Reactive Monomer Vehicle | 30-60 | 20-90 | 30-50 | 50-90 |
| Tertiary Amine | 0.5-6 | 0-6 | 2-4 | 0-4 |
| Sensitizer (if used) | 0.1-6 | 0.1-2 | 0.5-1 | 0.5-1 |

The coating composition is applied to a usual substrate metal, paper, leather, cloth, etc. using any of the usual methods of application, including wiping, spraying and rollcoat application. Suitable metallic substrates include aluminum, steel, and tin-plated steel. The rate of application will be sufficient to apply the coating at aqueous KOH, agreed, thereby indicating the complete absence of anhydride functionality. The normal time for this phase of the resin preparation was 1.5 hours. At this point, was added 6835 g. hydroxypropyl acrylate. The final product was a 60/40 ratio of prepolymer/monomer having a viscosity of 850–900 cp at 80° F. a weight/gallon of 9.5 pounds/gallon, and an acid value of 28–35. The molar ratio of maleic anhydride to epoxy resin was 0.25.

The following Examples 3 and 4 demonstrate coatings curable by electron beam radiation.

EXAMPLE 3

In a suitable sized high speed disperser, were thoroughly mixed 27.1 pounds of the product from Example 1 and 42.8 pounds titanium dioxide pigment and the mixture was stirred until a fineness of grind of 7 or better was obtained. Then were added 31.4 pounds hydroxypropyl acrylate, and 20.2 pounds of the product from Example 1 and the mixture was stirred until uniform. The resultant finish had a pigment/binder ratio of 0.52/1 and a prepolymer/total binder ratio of 0.4/1.

EXAMPLE 4

Using the equipment of Example 3, were thoroughly mixed 27.3 pounds of the resin solution of Example 2, and 42.9 pounds of titanium dioxide pigment. Continued high speed agitation until a fineness of grind of 7 minimum was obtained. Agitation was continued but at slower speed, while adding 10.0 pounds of resin solution of Example 2 and 17.5 pounds of hydroxypropyl acrylate. This was stirred until uniform. The resultant finish had a pigment/binder ratio of 0.78/1 and a prepolymer/total binder ratio of 0.4/1.

EXAMPLE 5

To a suitable sized pebble mill, were charged one pound 2-chlorothioxanthone and 2 pounds hydroxypropyl acrylate. This was ground for 24 hours, until thoroughly dispersed. The product is suited for use as a photoinitiator for pigmented finishes.

EXAMPLE 6

In a suitably sized high speed disperser, were thoroughly mixed 27.1 pounds of the product from Example 1, 42.8 pounds titanium dioxide pigment, and 1.5 pounds of the product of Example 5. This was stirred until a fineness of grind of 7 or better was obtained. Then, were added 31.4 pounds hydroxypropyl acrylate, 2.0 pounds methyldiethanolamine and 20.2 pounds of the product of Example 1. The mixture was stirred until uniform. The resultant finish had a pigment/binder ratio of 0.52/1 and a prepolymer/total binder ratio of 0.4/1.

EXAMPLE 7

Using the equipment of Example 6, were thoroughly mixed 27.3 pounds of the resin solution of Example 2, 42.9 pounds of titanium dioxide pigment, and 0.8 pounds of 2-chlorothioxanthone. High speed agitation was continued until a fineness of grind of 7 minimum was obtained. Agitation was continued but at slower speed while adding 10.0 pounds of resin solution of Example 2, 17.5 pounds of hydroxypropyl acrylate, and 1.5 pounds of methyldiethanolamine. This was stirred until uniform. The resultant finish had a pigment/binder ratio of 0.78/1 and a prepolymer/total binder ratio of 0.4/1.

EXAMPLES 8 through 27

In Table II are set forth data on various coatings prepared using the techniques and methods set forth in Examples 1 through 7. Each coating was applied to various substrates, cured by ultraviolet light (UV) or electron beam (EB), and tested for film properties. The adhesion test is carried out by cross-hatching a coated area with individual score lines approximately 1/16 inch apart. Then Scotch tape is firmly applied to the cross-hatched area and removed with a quick snap. The amount of coating remaining on the panel is observed visually and rated on a percentage basis. Pasteurization is carried out by immersing the coated panels in water at 155° F. for 30 minutes. Then, the panels are wiped dry with an absorbent towel and the adhesion test is carried out as aforedescribed.

In Table II, the following abbreviations are used:

1004 = Epon 1004 Reaction product epichlorohydrin and bisphenol A. M.W. about 1400, Epoxide value 0.10 – 0.12.
828 = Epon 828 Diglycidylether of bisphenol A. M.W. about 350 – 400. Epoxide value 0.50 – 0.54.
A = 2 moles acrylic acid per mole epoxy
M = 0.25 moles maleic anhydride per mole epoxy
HPA = Hydroxypropyl Acrylate
HEA = Hydroxyethyl Acrylate
2-EHA = 2-Ethylhexyl Acrylate
MDEOA = Methyldiethanolamine
TEOA = Triethanolamine
cps = Centipoise
Al = Aluminum
CCO = Chrome-chrome oxide treated steel
CDC5 = #5 grade of tinplate steel
$TiO_2$ = Titanium Dioxide
THP = = 4-Tetrahydrophthalic anhydride
CTX = 2-Chlorothioxanthone
Monomer = Reactive monomer vehicle
UV-25 = Ultraviolet light at line speed 25 ft./min per lamp.

TABLE II

VISCOSITY-ADHESION-GLOSS-LEVELING EFFECTS FOR VARIOUS LEVELS OF EPOXY MOLE WEIGHT AND ANHYDRIDE

| | Composition, Wgt. % | | | | | | | | Viscosity cps at sheer rate | |
|---|---|---|---|---|---|---|---|---|---|---|
| | Resin | | Monomer | | $TiO_2$ | CTX | Amine | | | |
| Ex. | Type | Wt. % | Type | Wt. % | Wt. % | Wt. % | Type | Wt. % | 222 sec$^{-1}$ | .0028 sec$^{-1}$ |
| 8 | 828/A/M | 23.0 | HPA | 29.7 | 42 | .5 | MDEOA | 4 | 615 | 18,000 |
| 9 | 828/A/M | 23.2 | HPA | 34.8 | 42 | — | — | — | 600 | 10,000 |
| 10 | 828/A/M | 42 | HPA | 53 | — | 1.0 | MDEOA | 4 | 200 | 200 |
| 11 | 828/A/M | 44 | HPA | 56 | — | — | — | — | 250 | 300 |
| 12 | 828/A | 22.8 | HPA | 33.4 | 42 | 1.0 | MDEOA | 4 | 375 | 29,000 |
| 13 | 828/A | 23.2 | HPA | 34.8 | 42 | — | — | — | 400 | 60,000 |
| 14 | 828/A | 53 | HPA | 44 | — | 1.0 | MDEOA | 2 | 200 | 300 |
| 15 | 828/A | 45 | HPA | 55 | — | — | — | — | 150 | 200 |
| 16 | 1004/A/M | 20 | HPA | 41.7 | 33.3 | 1.0 | MDEOA | 4 | 1000 | 2,460 |
| 17 | 1004/A/M | 20 | HPA | 46.7 | 33.3 | — | — | — | 1200 | 4,000 |
| 18 | 1004/A/M | 30 | HPA | 66.5 | — | .5 | MDEOA | 3 | 400 | 400 |
| 19 | 1004/A/M | 30 | HPA | 70 | — | — | — | — | 500 | 600 |
| 20 | 1004/A | 20 | HPA | 42.2 | 33.3 | 1.0 | MDEOA | 4 | 900 | 15,000 |
| 21 | 1004/A | 20 | HPA | 46.7 | 33.3 | — | — | — | 900 | 45,000 |

TABLE II-continued

| | | | | | | | | | | |
|---|---|---|---|---|---|---|---|---|---|---|
| 22 | 1004/A | 30 | HPA | 66.5 | — | .5 | MDEOA | 4 | 350 | 350 |
| 23 | 1004/A | 30 | HPA | 70 | — | 0 | — | — | 450 | 550 |
| 24 | 828/A | 23.2 | HEA | 30.3 | 42 | .5 | MDEOA | 4 | 500 | 35,000 |
| 25 | 828/A | 28.6 | HPA | 25.6 | 42 | 1.0 | TEOA | 2 | 1200 | 60,000 |
| 26 | 828/A/M | 23.0 | HPA/2-EHA | 14.6/14.6 | 42 | 1.0 | MDEOA | 4 | 670 | 156,000 |
| 27 | 828/A/THP | 23.2 | HPA | 30.3 | 37 | .5 | MDEOA | 4 | 244 | 24,000 |

| Ex. | Cure Condition | Al | CCO | CDC$_5$ | Al | CCO | CDC$_5$ | 60° Gloss % | Leveling |
|---|---|---|---|---|---|---|---|---|---|
| 8 | UV-25 | 100 | 100 | 25 | 100 | 100 | 0 | 30 | Good |
| 9 | EB-2 | 100 | 100 | 25 | 100 | 100 | 0 | 90 | Good |
| 10 | UV-25 | 100 | 0 | 0 | 100 | 0 | 0 | 80 | Excellent |
| 11 | EB-2 | 100 | 0 | 0 | 100 | 0 | 0 | 95 | Excellent |
| 12 | UV-25 | 100 | 0 | 0 | 100 | 0 | 0 | 50 | Poor |
| 13 | EB-2 | 100 | 0 | 0 | 100 | 0 | 0 | 90 | Poor |
| 14 | UV-25 | 0 | 0 | 0 | 0 | 0 | 0 | 80 | Excellent |
| 15 | EB-2 | 0 | 0 | 0 | 0 | 0 | 0 | 95 | Excellent |
| 16 | UV-25 | 100 | 100 | 100 | 100 | 100 | 50 | 60 | Excellent |
| 17 | EB-2 | 100 | 100 | 100 | 100 | 100 | 50 | 90 | Excellent |
| 18 | UV-25 | 100 | 100 | 100 | 100 | 100 | 0 | 80 | Excellent |
| 19 | EB-2 | 100 | 100 | 100 | 100 | 100 | 0 | 90 | Excellent |
| 20 | UV-25 | 100 | 100 | 0 | 100 | 100 | 0 | 55 | Fair |
| 21 | EB-2 | 100 | 100 | 0 | 100 | 100 | 0 | 90 | Fair |
| 22 | UV-25 | 100 | 0 | 0 | 100 | 0 | 0 | 80 | Excellent |
| 23 | EB-2 | 100 | 0 | 0 | 100 | 0 | 0 | 90 | Excellent |
| 24 | UV-25 | 100 | 100 | 25 | 100 | 100 | 0 | 55 | Fair |
| 25 | UV-25 | 100 | 100 | 25 | 100 | 100 | 0 | 65 | Good |
| 26 | UV-25 | 100 | 100 | 100 | 100 | 100 | 0 | 15 | Fair |
| 27 | UV-25 | 100 | 100 | 100 | 100 | 50 | 0 | 60 | Fair |

The results given in Table I indicate that:

a. Increasing epoxy resin molecular weight improves adhesion to metals.

b. Maleic anhydride adducts have better adhesion to metals and demonstrate better leveling than compositions containing resins containing no maleic anhydride.

c. Coatings containing TiO$_2$ have better adhesion to metals than do coatings of identical composition but without TiO$_2$.

The coating compositions that have been described and illustrated hereinbefore can be considered the "basic" coating compositions. It has been found that certain properties of the cured film can be markedly improved by incorporating additional chemicals into the basic coating compositions.

With the basic pigmented UV curable coating compositions, the gloss of the cured film is usually lower than desired, particularly at higher cure rates. This occurs because the pigments absorb the UV light and hinder the cure. This gloss can be markedly increased by using in the coating composition a sensitizer combination of 2-chlorothioxanthone and a phenyl ketone. Benzophenone is the preferred phenyl ketone, but other phenyl ketones are contemplated, such as acetophenone, propiophenone, and butyrophenone.

This improvement in gloss was very surprising and unexpected, because a combination of a phenyl ketone, such as benzophenone, with an amine co-sensitizer, methyldiethanolamine (MDEOA), will not effect a cure of a pigmented coating composition of this invention. This will be apparent from the following example.

EXAMPLE 28

A coating formulation was prepared using the technique and methods of Examples 1-7, which contained by weight of the formulation of 24.5 percent of the diacrylate of Epon 828, 37.7 percent TiO$_2$, 33.7 percent of methylcarbamoyloxyethyl acrylate, 1.6 percent benzophenone, and 2.5 percent methyldiethanolamine. Aluminum test panels were coated with this coating composition and UV cured at a speed of 10 ft./min. under both air and nitrogen atmospheres. In air, there was no cure and the coating was chalky. In nitrogen, there also was no cure and the coating was flat and soft.

The following examples demonstrate this gloss improvement. In each example, using the techniques and methods of Examples 1-7, a pigmented coating composition (A) without benzophenone (Bzph) and (B) with benzophenone were coated on aluminum and exposed to UV at various cure speeds. The resulting films were tested for 60° gloss.

EXAMPLE 29

An epoxy diacrylate of Epon 828 was modified with 0.25 mole maleic anhydride per mole epoxy. This resin (Resin A) was admixed with hydroxypropyl acrylate, TiO$_2$ pigment, and sensitizers and co-sensitizers. The following tabulation sets forth amounts of components, pigment/binder ratio (P/B), resinbinder ratio (R/B), and pertinent test data.

| Example | TiO$_2$ | CTX | MDEOA | Resin A |
|---|---|---|---|---|
| 28A | 36.6 | 0.9 | 3.6 | 24.5 |
| 28B | 36.6 | 0.9 | 3.6 | 24.5 |
| Example | HPA | Bzph | P/B | R/B |
| 28A | 34.4 | 0 | .58 | .39 |
| 28B | 32.4 | 2.0 | .58 | .39 |
| | | | No Bzph | 2% Bzph |
| UV Cure Speed 25 FPM | Yield | | 90 | 90 |
| | Gloss | | 79 | 88 |

EXAMPLE 30

An epoxy diacrylate of Epon 828 (Resin B) was admixed with hydroxypropyl acrylate, TiO$_2$ pigment, and sensitizers and co-sensitizers. The following tabulation sets forth amounts of components and pertinent test data.

| Example | TiO$_2$ | Resin B | HPA | CTX |
|---|---|---|---|---|
| 29A | 42.8 | 28.6 | 25.6 | 1.0 |
| 29B | 41.5 | 27.7 | 24.8 | 1.0 |
| Example | MDEOA | Bzph | P/B | R/B |
| 29A | 2.0 | 0 | .75 | .50 |
| 29B | 3.0 | 2.0 | .71 | .475 |

-continued

| UV Cure Speed, FPM | | No Bzph | 2% Bzph |
|---|---|---|---|
| 25 | Yield | 94 | 91 |
|  | Gloss | 95 | 95 |
| 50 | Yield | 91 | 87 |
|  | Gloss | 77 | 93 |
| 100 | Yield | 87 | 84 |
|  | Gloss | 39 | 90 |

EXAMPLE 31

An epoxy diacrylate of Epon 1004 was modified with 0.25 mole maleic anhydride per mole epoxy. This resin (Resin C) was admixed with hydroxypropylacylate, $TiO_2$ pigment, and sensitizers and co-sensitizers. The following tabulation sets forth amounts of components and pertinent test data.

| Example | $TiO_2$ | Resin C | CTX |
|---|---|---|---|
| 30A | 33.3 | 20.0 | 1.0 |
| 30B | 33.0 | 19.8 | 1.0 |
| Example | MDEOA | HPA | Bzph |
| 30A | 4.0 | 41.7 | 0 |
| 30B | 4.0 | 41.2 | 1.0 |
| UV Cure Speed, FPM | | No Bzph | 1% Bzph |
| 25 | Yield | 88 | 88 |
|  | Gloss | 89 | 89 |
| 50 | Yield | 86 | 85 |
|  | Gloss | 75 | 88 |
| 100 | Yield | 73 | 77 |
|  | Gloss | 45 | 62 |

The preceding examples illustrate that benzophenone (a phenyl ketone), which used alone will not effect a cure, when used in combination with 2-chlorothioxanthone has essentially no effect on film yield, but increases the gloss of pigmented UV curable coatings. Each sensitizer is used as described hereinbefore, in amounts of between about 0.1% and about 6% by weight.

It has been found that adhesion of the cured coating to some substrates, particularly pasteurized adhesion (Past. Adh.), is improved by using dimethylaminoethyl acrylate (DMAEA) in the coating composition. In the case of EB curable coatings, the DMAEA is added to the coating composition in amounts of between about 0.5% and about 6% by weight. In the case of UV curable coatings the DMAEA is used in amounts of between about 0.5% and about 6% by weight to replace all or a part of the tertiary amine co-sensitizer.

EXAMPLE 32

Resin B (Example 29) was admixed with hydroxypropyl acrylate, 2-chlorothioxanthone, and MDEOA or DMAEA. Each coating was coated on aluminum panels and UV cured. The coated panels were subjected to adhesion tests. Amounts of components and test results are set forth in the following tabulation.

| Example | Resin B | CTX | HPA | MDEOA | DMAEA |
|---|---|---|---|---|---|
| 31A | 49.5 | 1.0 | 44.5 | 0 | 5 |
| 31B | 50.0 | 1.0 | 47.0 | 2 | 0 |
| 50 FPM UV Cure | | | | | |
| Example | Film Yield | Adhesion | Past. Adh. | | |
| 31A | 92 | 100 | 50 | | |
| 31B | 89 | 20 | 0 | | |

EXAMPLE 33

Resin C (Example 30) was admixed with hydroxypropyl acrylate, 2-chlorothioxanthone, and MDEOA or DMAEA. Each coating was coated on aluminum panels and UV cured. The coated panels were subjected to adhesion tests. Amounts of components and test results are set forth in the following tabulation.

| Example | Resin C | HPA | CTX | MDEOA | DMAEA |
|---|---|---|---|---|---|
| 32A | 29.2 | 68.2 | 0.5 | 2 | 0 |
| 32B | 29.2 | 68.2 | 0.5 | 0 | 2 |
| Example | UV Cure Speed, FPM | Film Yield | Adh. | | Past. Adh. |
| 32A | 25 | 92 | 100 | | 85 |
|  | 50 | 87 | 100 | | 70 |
| 32B | 25 | 89 | 100 | | 100 |
|  | 50 | 87 | 100 | | 100 |

EXAMPLE 34

Resin B (Example 29) was admixed with hydroxypropyl acrylate, $TiO_2$ pigment, 1.0% 2-chlorothioxanthone, and MDEOA or DMAEA. The P/B of each coating was 0.75 and the R/B was 0.40. Each coating was coated on metal panels and UV cured. The coated panels were subjected to adhesion tests. Results are set forth in the following tabulation.

| Example | Amine | Viscosity, cp | |
|---|---|---|---|
|  |  | $222\ sec^{-1}$ | $.0228\ sec^{-1}$ |
| 33A | 4% MDEOA | 395 | 29,100 |
| 33B | 5% DMAEA | 283 | 564 |
|  | 50 FPM | Adhesion to | |
| Example | Yield | Al | CCO |
| 33A | 89 | 100 | 0 |
| 33B | 89 | 100 | 100 |

EXAMPLE 35

Resin B (Example 29) was admixed with hydroxypropyl acrylate, $TiO_2$ pigment, 1.0% 2-chlorothioxanthone, and MDEOA or DMAEA. The P/B of each coating was 0.75 and the R/B was 0.6. Each coating was coated on metal panels and UV cured. The coated panels were subjected to adhesion tests. Results are set forth in the following tabulation.

| Example | Amine | $222\ sec^{-1}$ | $.0228\ sec^{-1}$ |
|---|---|---|---|
| 34A | 4% MDEOA | 800 | 86,100 |
| 34B | 5% DMAEA | 598 | 14,800 |
|  | 50 FPM | Adhesion to | |
| Example | Yield | Al | CCO |
| 34A | 88 | 100 | 0 |
| 34B | 89 | 100 | 100 |

It will be noted from the preceding examples that the use of dimethylaminoethyl acrylate gives at least equivalent UV cure. It also provides improved adhesion, both dry and wet.

The following examples are illustrative of preferred coating compositions of this invention.

EXAMPLE 36

Using a reaction vessel equipped with an agitator, a reflux condenser, an inert gas inlet and a charging port, there were charged 525 g. Epon 1004 and 70 g. toluene.

Heat, agitation, and slow inert gas flow were started. Temperature was raised to reflux to remove water (a pot temperature of 150–160° C.). The mixture was cooled to 80°–85° C. and there were added 40 g. glacial acrylic acid, 1 g. hydroquinone. Temperature was raised to 95–100° C. for esterification and the reaction continued until an acid number of 8–13 was obtained. This was cooled to 80–85° C. and there was added 7 g. maleic anhydride. Temperature was held at 80–85° C. for 1-½ to 2 hours until alcoholic KOH and aqueous KOH acid numbers agreed (10–15). Heat source was removed and 175 g. hydroxypropyl acrylate was added. This mixture was reheated to 80°–85° C. and vacuum applied for toluene removal. Removed heat and added an additional 182 g. hydroxypropyl acrylate. The final product had a viscosity of 45–50,000 cp., a wt./gal. of 9.6 lb., an acid number of 10.5 and a total solids of approximately 97%. This resin was used in the formulations of Examples 36–38 (amounts are wt.% of formulation):

| EXAMPLES 37–39 (Clear Finishes) | | | |
|---|---|---|---|
| Ingredient | 36 | 37 | 38 |
| Example 35 Composition | 40.3 | 56.4 | 33.2 |
| Hydroxypropyl acrylate | 56.3 | 40.2 | 37.6 |
| Phenylcellosolve acrylate | — | — | 21.8 |
| Methyldiethanolamine | 1.9 | 1.9 | 2.9 |
| Dimethylaminoethyl acrylate | — | — | 3.5 |
| 2-Chlorothioxanthone | 0.5 | 0.5 | 0.5 |
| Fluorocarbon wetting agent | — | — | 0.5 |
| Silicone lubricant | 1.0 | 1.0 | — |
| Viscosity (seconds #4 Ford Cup) | 50–60 | 175–225 | 30–35 |
| Wt./gal. (lb.) | 9.04 | 9.40 | 8.95 |

Examples 36 and 37 were formulated as an abrasion resistant coating for can bottoms, which is applied by a wiping action and given UV treatment of 1–2 seconds with no post bake required.

Example 38 was formulated as a coating for flat sheet and is suitable for rollcoat application and given 1 second exposure to UV radiation, followed by a 10 minute oven bake at 340°–400° F. The Phenylcellosolve acrylate in Example 38 imparts improved corrosion resistance and flexibility.

EXAMPLE 40

There were charged 312 g. of an epoxy diacrylate made from Epon 828 and acrylic acid, 430 g. titanium dioxide, 198 g. Cellosolve acrylate, 10 g. 2-chlorothioxanthone, 40 g. dimethylaminoethyl acrylate and 10 g. benzophenone to a suitably sized pebble mill and ground to a fineness of 7 when measured on a Hegman fineness of grind gauge. Grind time is 24–48 hours. The final product was a white finish suitable for rollcoat application on flat sheet. The finish had a viscosity of 90–100 sec. #4 Ford Cup and a weight per gallon of 13.1–13.3 pounds.

It is normally applied at 10 mg./sq. in. and cured using a 1 sec. UV exposure followed by a 6 minute bake at 325° F. After the UV exposure, the film was sufficiently set to accept inks and a wet ink varnish. The 6 min. at 325° F. bake indicated above followed inking and varnishing operations.

It will be noted that in Examples 39 and 40, Dimethylaminoethyl acrylate was used. This compound has a tertiary amine functionality. Thus, as aforedescribed, it can replace the tertiary amine (used to speed up the cure rate) partially (Example 39) or entirely (Example 40). This compound also has reactive ethylenically unsaturated functionality (acrylate) and therefore acts as a reactive monomer. Its use affords a coating composition having improved rheology, as evidenced by better flow characteristics, and the cured coating has improved adhesion to metal substrates. The addition of benzophenone to the coating composition (Example 40) improves the gloss of the pigmented finish.

Other well known adjuvants may be added to the coating composition such as flow control agents and waxes. Waxes, if used, are added as slurries or emulsions of petroleum (paraffin) wax, natural waxes such as montan wax, beeswax, and carnuba wax, or synthetic waxes such as polyethylene wax.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. In a coating composition for curing by UV light that comprises, by weight of said composition, 10–30% of a diacrylate of a diglycidyl ether of a bisphenol or of a diacrylate of a diglycidyl ether of a bisphenol further esterified with 0.1–1 mole, per mole of said diacrylate, of a dicarboxylic acid anhydride, 30–60% of an ester of acrylic acid, 25–60% of a pigment, and a sensitizer combination 0.1–6% of 2-chlorothioxanthone and 0.5–6% of a tertiary amine; the improvement of increasing the gloss of a UV cured film thereof consisting essentially of using in said coating composition 0.1–6% of a phenone.

2. The coating composition of claim 1, wherein said bisphenol is bisphenol A and said anhydride is maleic anhydride.

3. The coating composition of claim 2, wherein said pigment is titanium dioxide.

4. The coating composition of claim 1, wherein said ester of acrylic acid is hydroxypropyl acrylate, said phenone is benzophenone, and said tertiary amine is methyldiethanolamine.

5. The coating composition of claim 2, wherein said ester of acrylic acid is hydroxypropyl acrylate, said phenone is benzophenone, and said tertiary amine is methyldiethanolamine.

6. The coating composition of claim 3, wherein said ester of acrylic acid is hydroxypropyl acrylate, said phenone is benzophenone, and said tertiary amine is methyldiethanolamine.

* * * * *

UNITED STATES PATENT AND TRADEMARK OFFICE
CERTIFICATE OF CORRECTION

PATENT NO. : 4,071,425
DATED : January 31, 1978
INVENTOR(S) : JOHN P. GUARINO and WILLIAM H. McCARTY It is certified that error appears in the above-identified patent and that said Letters Patent are hereby corrected as shown below:

| | |
|---|---|
| Col. 1, line 30 | "monomer. a" should read --- monomer.  A --- . |
| Col. 2, line 18 | "Therefor" should read ---Therefore--- . |
| Col. 2, line 21 | "the acylic acid" should read ---the acrylic acid--- . |
| Col. 3, line 17 | "benoin isobutyl" should read --- benzoin isobutyl ---. |
| Col. 4, line 29 | "value of 0.050 - 0.54" should read --- value of 0.50 - 0.54 --- . |
| Col. 7, line 62 | "formulation of 24.5 percent" should read --- formulation 24.5 percent ---. |
| Col. 8. line 42 | "resinbinder ratio" should read --- resin/binder ratio ---. |
| Col. 9, line 14 | "with hydroxypropylacylate" should read --- with hydroxypropylacrylate --- . |

UNITED STATES PATENT AND TRADEMARK OFFICE
CERTIFICATE OF CORRECTION

PATENT NO. : 4071,425
DATED : January 31, 1978
INVENTOR(S) : JOHN P. GUARINO and WILLIAM H. McCARTY It is certified that error appears in the above-identified patent and that said Letters Patent are hereby corrected as shown below:

Col. 11, line 5     "acrylic acid, 1 g. hydroquinone" should read --- acrylic acid, 1 g. triethyl amine and 0.1 g. hydroquinone --- .

Col. 12, line 20     "and carnuba wax" should read --- and carnauba wax --- .

Signed and Sealed this

Eleventh Day of July 1978

[SEAL]

Attest:

RUTH C. MASON
Attesting Officer

DONALD W. BANNER
Commissioner of Patents and Trademarks